United States Patent
Li et al.

(10) Patent No.: US 11,287,907 B1
(45) Date of Patent: Mar. 29, 2022

(54) TOUCH PAD MODULE

(71) Applicant: CHICONY ELECTRONICS CO., LTD., New Taipei (TW)

(72) Inventors: Po-Hsin Li, New Taipei (TW); Wen-Han Chang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/143,578

(22) Filed: Jan. 7, 2021

(30) Foreign Application Priority Data

Sep. 29, 2020 (TW) ................................ 109133953

(51) Int. Cl.
*G06F 3/041* (2006.01)
*G06F 3/0354* (2013.01)

(52) U.S. Cl.
CPC ................................ *G06F 3/03547* (2013.01)

(58) Field of Classification Search
CPC .................................................. G06F 3/03547
See application file for complete search history.

(56) References Cited

U.S. PATENT DOCUMENTS

| 10,180,739 | B2 | 1/2019 | Kitamura et al. | |
| 10,725,567 | B1* | 7/2020 | Huang | G06F 1/1671 |
| 2010/0079404 | A1* | 4/2010 | Degner | G06F 3/042 |
| | | | | 345/174 |
| 2012/0134109 | A1* | 5/2012 | Takahashi | G06F 1/1684 |
| | | | | 361/679.55 |
| 2012/0182236 | A1* | 7/2012 | Tsai | G06F 3/03547 |
| | | | | 345/173 |
| 2013/0050099 | A1* | 2/2013 | Hirano | G06F 3/03547 |
| | | | | 345/173 |
| 2016/0234362 | A1* | 8/2016 | Moon | H04M 1/185 |
| 2019/0243475 | A1* | 8/2019 | Huang | G06F 3/03547 |
| 2019/0384426 | A1* | 12/2019 | Huang | G06F 3/0362 |
| 2021/0307186 | A1* | 9/2021 | Hong | F16C 11/04 |

FOREIGN PATENT DOCUMENTS

| CN | 106339030 A | | 1/2017 |
| CN | 110609587 A | * | 12/2019 |
| TW | 201944217 A | | 11/2019 |

* cited by examiner

*Primary Examiner* — Joe H Cheng
(74) *Attorney, Agent, or Firm* — Muncy, Geissler, Olds & Lowe, P.C.

(57) ABSTRACT

The present invention discloses a touch pad module, which includes a touch panel, a frame and a linkage assembly. The frame is disposed under the touch panel. The linkage assembly is disposed between the touch panel and the frame. The linkage assembly includes an elastic plate and supporting plate. The elastic plate has a first portion, a second portion and a third portion. The second portion is located between the first portion and the third portion, the first portion is connected to the touch panel, and the third portion is connected to the frame. The supporting plate is correspondingly disposed on the second portion of the elastic plate.

11 Claims, 8 Drawing Sheets

TOUCH PAD MODULE

This application claims priority under 35 U.S.C. § 119 of Taiwan Application No. TW 109133953 filed on Sep. 29, 2020, the disclosure of which is incorporated by reference.

BACKGROUND

1. Technical Field

The present invention relates to a touch pad module.

2. Description of the Related Art

Notebook computers are often equipped with a touch pad module to allow users to operate the notebook computer by touch (using a finger to press or slide on the touch pad) to replace the function of the mouse.

Generally speaking, the main components of the touch pad module comprise, from top to bottom, a touch panel, a circuit board and a frame in sequence. The two opposite sides of the touch panel are a fixed end and a movable end, respectively. Specifically, one side of the touch panel can be fixed to the frame or directly fixed to the casing of the notebook computer, while the other unfixed side is a movable end. In addition, the touch panel module has a restoring member (e.g., a dome sheet) disposed on the frame and located in the middle position of the movable end. When the user presses the movable end, the touch panel can move up and down and trigger an input command.

In order to improve the convenience of the user's operation, the area of a touch pad module has a tendency to become larger and larger. However, the conventional touch pad module has no structure to support the touch panel and the circuit board except for the frame. Therefore, the corners of the movable end (i.e., the two ends away from the restoring member) of the touch pad module will have insufficient pressing rigidity. In other words, when a corner of the movable end is pressed, it will produce a poor touch feeling such as shaking, and there is indeed a need for improvement.

SUMMARY

In view of the above issues, it is an objective of the present invention to provide a touch pad module to resolve the issue of insufficient pressing rigidity of the conventional touch pad module through a linkage assembly having an elastic plate and a supporting plate.

In order to achieve the above objective, the present invention provides a touch pad module which comprises a touch panel, a frame and a linkage assembly. The frame is disposed under the touch panel. The linkage assembly is disposed between the touch panel and the frame. The linkage assembly comprises an elastic plate and a supporting plate. The elastic plate has a first portion, a second portion and a third portion. The second portion is located between the first portion and the third portion; the first portion is connected to the touch panel, and the third portion is connected to the frame. The supporting plate is correspondingly disposed on the second portion of the elastic plate.

In an embodiment of the present invention, the elastic plate has at least one first perforation located between the first portion and the second portion. The supporting plate has at least one first extension portion, which passes through the first perforation and abuts against the touch panel.

In an embodiment of the present invention, the supporting plate has at least one second extension portion, the two opposite surfaces of which are in contact with the frame and the elastic plate, respectively.

In an embodiment of the present invention, the elastic plate has at least one bending portion located between the second portion and the third portion.

In an embodiment of the present invention, the elastic plate has a plurality of said bending portions and a plurality of second perforations. The second perforations are located between the bending portions.

In an embodiment of the present invention, the supporting plate has a rigid reinforced structure located in the central area of the supporting plate.

In an embodiment of the present invention, the rigidity of the supporting plate is greater than that of the elastic plate.

In an embodiment of the present invention, the thickness of the supporting plate is greater than that of the elastic plate.

In an embodiment of the present invention, the linkage assembly further comprises a gasket, which is disposed on the surface of the elastic plate close to the frame and located in the third portion. The elastic plate is fixed to the frame through the gasket.

In an embodiment of the present invention, the touch panel comprises a fixed end and a movable end opposite to each other. The linkage assembly is close to the movable end, and the first portion of the elastic plate is close to the movable end.

In an embodiment of the present invention, the touch panel comprises a touch board and a circuit board. The touch board has a touch surface and a bottom surface opposite to each other, and the circuit board is disposed on the bottom surface.

As mentioned above, according to the touch pad module of the present invention, the linkage assembly is disposed between the touch panel and the frame and comprises an elastic plate and a supporting plate. The elastic plate has a first portion, a second portion and a third portion. The first portion is connected to the touch panel and the third portion is connected to the frame such that the linkage assembly is disposed between the touch panel and the frame through the elastic plate. The supporting plate is correspondingly disposed in the second portion to increase the overall rigidity of the linkage assembly. With the installation of the linkage assembly, the arm of the pressing force of the touch pad module can be shortened when the touch pad module is pressed, thereby achieving the effect of reducing deformation, reducing shaking and improving the tactile feeling of pressing.

BRIEF DESCRIPTION OF THE DRAWINGS

In the drawings, wherein similar reference numerals denote similar elements throughout the several views.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1:
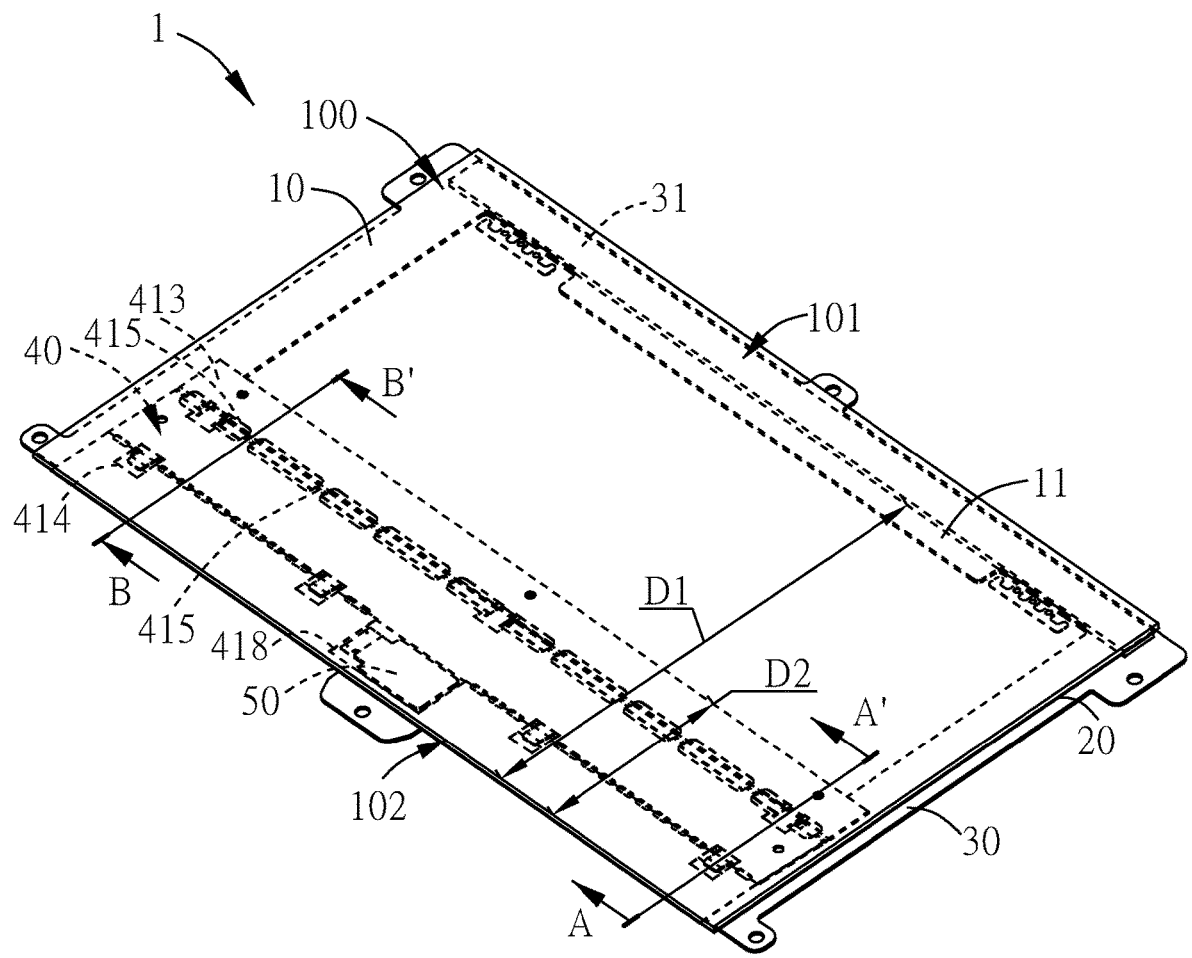
FIG. 1 is a schematic diagram of a touch pad module of one embodiment of the present invention.
Figure 2:
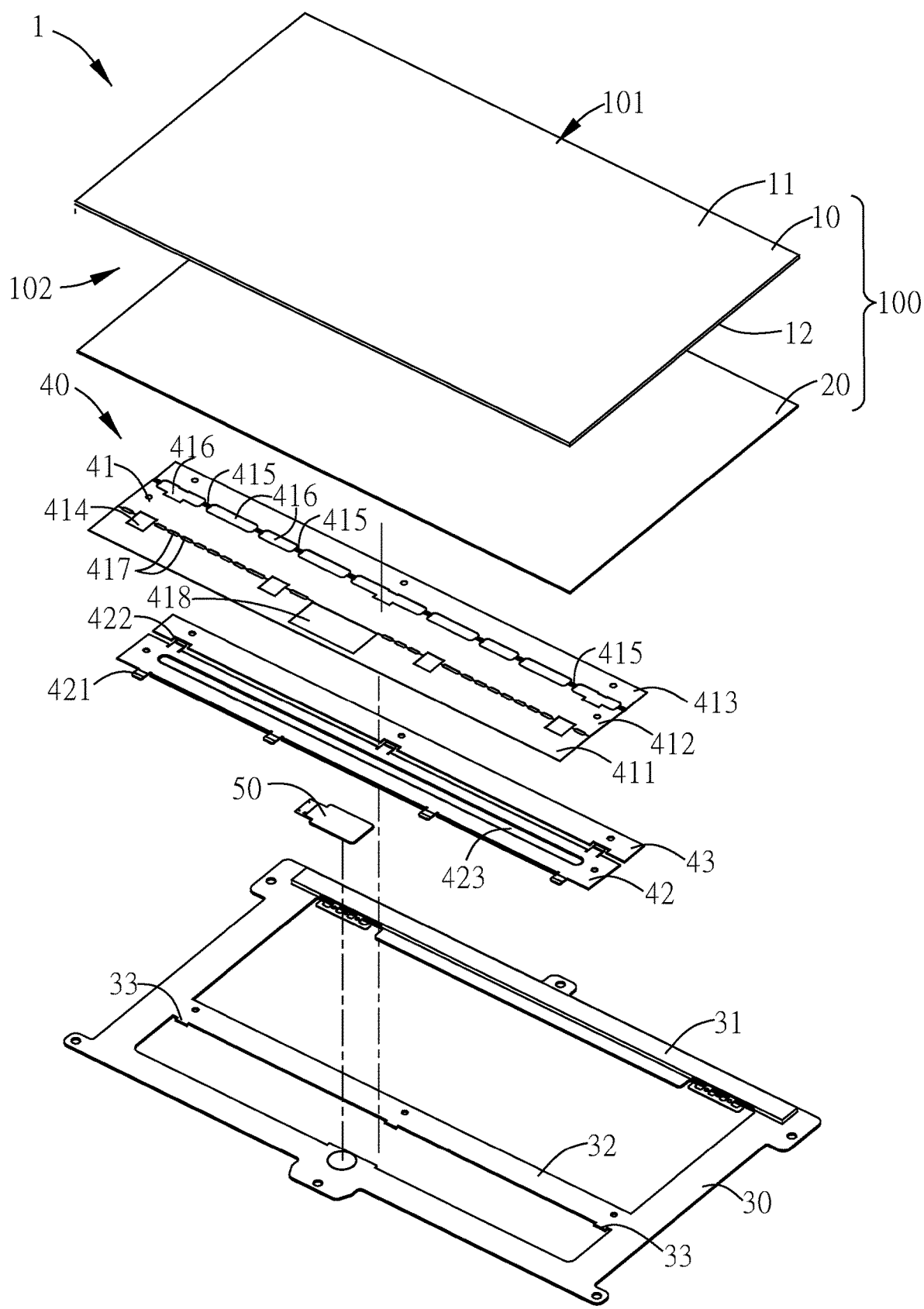
FIG. 2 is an exploded schematic diagram of the touch pad module shown in FIG. 1.

FIG. 1 is a schematic diagram of a touch pad module of one embodiment of the present invention, and FIG. 2 is an exploded schematic diagram of the touch pad module shown in FIG. 1. Please refer to FIG. 1 and FIG. 2 simultaneously. The touch pad module 1 of this embodiment can be applied to an electronic device, and the touch pad module 1 may be but is not limited to a notebook computer. The touch pad module 1 may be disposed on the casing of the electronic device for the user to operate the notebook computer in a touch mode and replace the function of a mouse. The touch pad module 1 of this embodiment comprises a touch panel 100. Preferably, the touch panel 100 comprises a touch board 10 and a circuit board 20, but the present invention is not limited thereto. In other embodiments, the touch board 10 and the circuit board 20 can also be a single board. In addition, the touch pad module 1 also comprises a frame 30 and a linkage assembly 40. The touch board 10 is a component for the user to perform touch operation and can be made of for example but not limited to, glass or Mylar. The touch board 10 has a touch surface 11 and a bottom surface 12 opposite to each other, and the circuit board 20 is disposed on the bottom surface 12. In other words, the circuit board 20 is disposed under the touch board 10. Moreover, the frame 30 is disposed under the touch panel 100 and under the circuit board 20. Specifically, the touch board 10 and the circuit board 20 are disposed above the frame 30 and are disposed on the casing of the electronic device through the frame 30. However, the present invention is not limited thereto. In other embodiments, the frame 30 can also be a part of the casing of the electronic device.

Specifically, the touch panel 100 has a fixed end 101 and a movable end 102 opposite to each other. As shown in FIG. 1, one side of the touch panel 100 is fixed to the frame 30 to act as the fixed end 101, and the opposite side is the movable end 102. Preferably, the frame 30 may have a supporting structure 31 disposed on the side of the frame 30 corresponding to the fixed end 101. The supporting structure 31 is connected to the touch panel 100 to elevate the touch panel 100. That is, the setting of the supporting structure 31 can provide a gap between the touch panel 100 and the frame 30 such that the other side of the touch panel 100 (the movable end 102) leaves a space for upward and downward movement. In addition, the touch pad module 1 further comprises a restoring member 50 disposed between the bottom surface of the circuit board 20 and the frame 30 and corresponding to the movable end 102. After the user presses the touch pad module 1, the restoring member 50 provides a restoring force to return the touch pad module 1 to its original position. In this embodiment, the restoring member 50 is a metal dome. In actual application, it can also be a rubber dome, a metal spring sheet, a spring or a magnetic mechanism using magnetic repulsion as the restoring force. The present invention is not limited thereto. When the user presses the area adjacent to the movable end 102, the touch panel 100 can move up and down and trigger an input command.

In this embodiment, the linkage assembly 40 is disposed between the circuit board 20 and the frame 30, and the linkage assembly 40 is close to the side of the movable end 102. The linkage assembly 40 comprises an elastic plate 41 and a supporting plate 42, wherein the elastic plate 41 has a first portion 411, a second portion 412 and a third portion 413, and the second portion 412 is located between the first portion 411 and the third portion 413.

Figure 3:
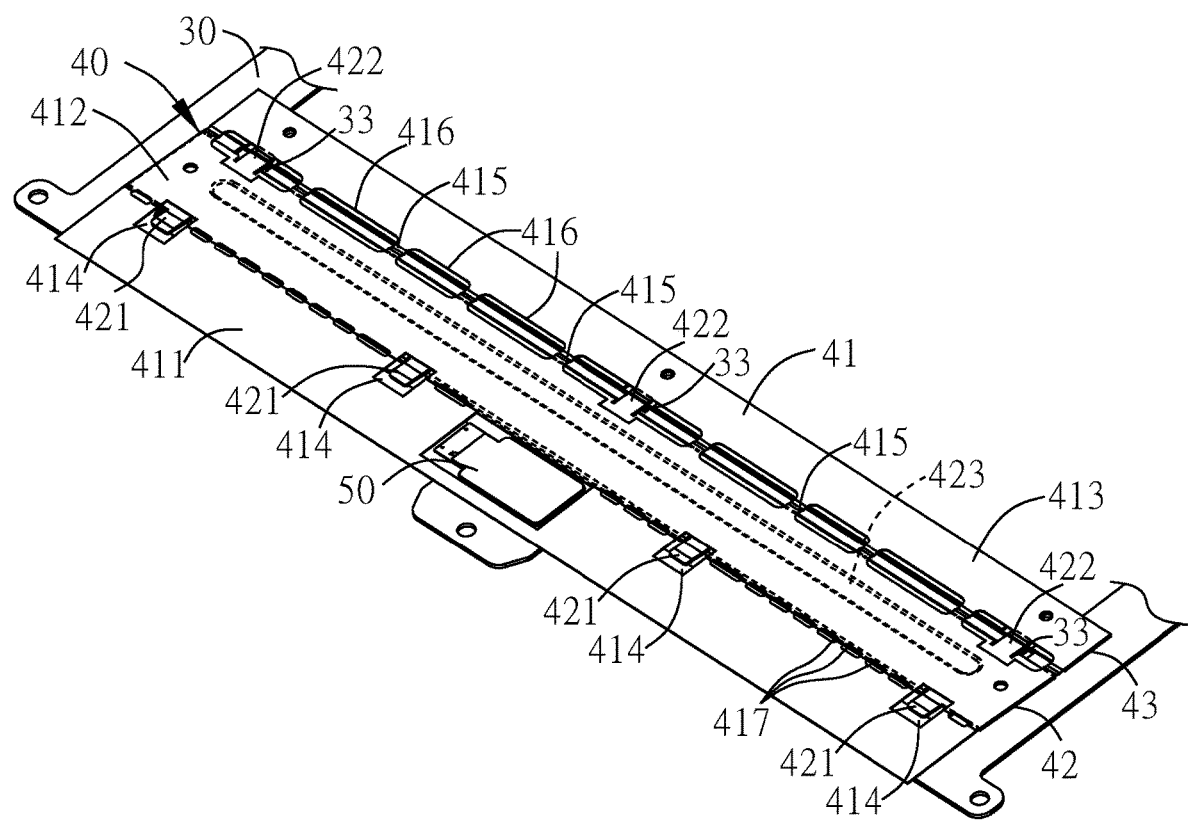
FIG. 3 is a schematic diagram of a linkage assembly and a frame shown in FIG. 2 after assembly.
Figure 4:
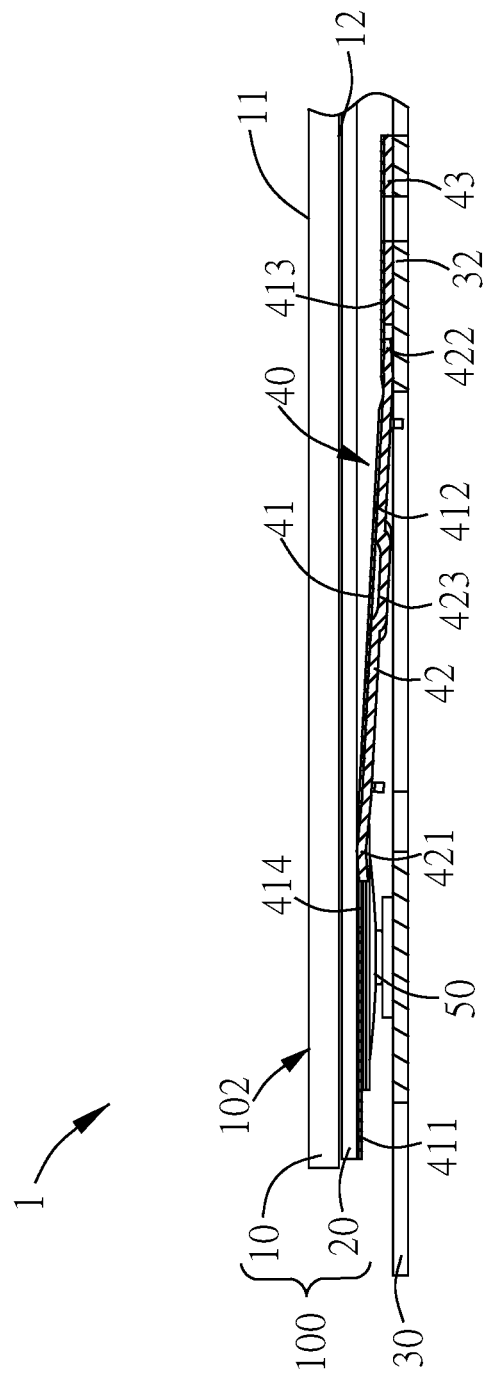
FIG. 4 is a schematic cross-sectional view of the touch pad module shown in FIG. 1 along the line A-A'.

FIG. 3 is a schematic diagram of the linkage assembly and the frame shown in FIG. 2 after assembly, and FIG. 4 is a schematic cross-sectional view of the touch pad module shown in FIG. 1 along the line A-A'. Please refer to FIG. 3 and FIG. 4. In this embodiment, the first portion 411 can be connected to the circuit board 20 and the third portion 413 can be connected to the frame 30 by means of an adhesive layer. In addition, the elastic plate 41 of this embodiment can be made of metal, such that the third portion 413 can also be connected to the frame 30 by metal spot welding or other suitable methods, but the present invention is not limited thereto. Since there is a gap between the touch panel 100 and the frame 30, the second portion 412 forms an inclined surface located between the touch panel 100 and the frame 30. In order to increase the structural strength of this area (i.e., the second portion 412), the supporting plate 42 is correspondingly disposed on the second portion 412 of the elastic plate 41. In this embodiment, the supporting plate 42 is disposed on a surface of the elastic plate 41 close to the frame 30. In other words, the supporting plate 42 is disposed under the second portion 412 of the elastic plate 41 to increase the rigidity of the overall structure of the linkage assembly 40.

Preferably, the rigidity of the supporting plate 42 is greater than that of the elastic plate 41. For instance, both the elastic plate 41 and the supporting plate 42 can be made of metal, and the thickness of the supporting plate 42 is greater than that of the elastic plate 41, such that the rigidity of the supporting plate 42 can be greater than that of the elastic plate 41. For instance, the elastic plate 41 can be a metal sheet, while the supporting plate 42 can be a metal plate, but the present invention is not limited thereto. Preferably, the supporting plate 42 is a metal plate having a rigid reinforced structure 423. The rigid reinforced structure 423 of this embodiment is a convex structure formed by stamping on the metal plate and located in the central area of the supporting plate 42. The present invention is not limited thereto. The rigidity can be enhanced by bonding a rod or a sheet to the supporting plate 42 or in other appropriate ways. The longitudinal direction of the rigid reinforced structure 423 is parallel to that of the supporting plate 42. The supporting plate 42 has the rigid reinforced structure 423, which can improve the rigidity of the supporting plate 42. Similarly, the supporting plate 42 can be connected to the second portion 412 of the elastic plate 41 by an adhesive layer or by metal spot welding. The supporting plate 42 can also be connected by other ways. The present invention is not limited thereto.

Please refer to FIG. 1. In the case that the linkage assembly 40 of the embodiment is not installed, the fulcrum of the touch panel 100 under force is at the fixed end 101. Specifically, when the user presses the movable end 102, the arm of the pressing force is the distance D1 between the movable end 102 and the fixed end 101 (fulcrum). The touch pad module 1 of this embodiment has a linkage assembly 40; the first portion 411 of the elastic plate 41 is connected to the touch panel 100 near the movable end 102, the third portion 413 of the elastic plate 41 is connected to the frame 30, and the third portion 413 is between the fixed end 101 and the movable end 102. With the structures aforementioned, when the user presses the movable end 102 of the touch panel 100, the pressing force can be transmitted from the linkage assembly 40 to the connection of the frame 30 (i.e., the third portion 413). In other words, the disposition of the linkage assembly 40 can shift the fulcrum of the touch board 10 and the circuit board 20 to a connection position between the third portion 413 and the frame 30. Therefore, the arm of the pressing force is the distance D2 from the movable end 102 to the connection position (i.e., fulcrum) of the third portion 413 and the frame 30. It can be seen from FIG. 1 that, since the touch pad module 1 of this embodiment is provided with the linkage assembly 40, the arm of the pressing force can be shortened to the distance D2 (compared to the distance D1 without the linkage assembly 40 installed). In addition, shortening the arm of the pressing force (i.e., shortening the distance of force transmission) can achieve the effect of reducing deformation, thereby reducing the wobbling and improving the feeling of pressing.

As shown in FIG. 2 and FIG. 4, the frame 30 of this embodiment further has a rib 32, which is close to the movable end 102 for connecting the third portion 413 of the elastic plate 41. It should also be noted that the third portion 413 of the elastic plate 41 can be directly or indirectly connected to the frame 30. In this embodiment, the third portion 413 is described with the example of the indirect connection to the frame 30. Specifically, the linkage assembly 40 further comprises a gasket 43 disposed on the surface of the elastic plate 41 close to the frame 30 and located at the third portion 413. In other words, the supporting plate 42 is disposed adjacent to the gasket 43. The supporting plate 42 is connected to the second portion 412, and the gasket 43 is connected to the third portion 413. The third portion 413 of the elastic plate 41 is fixed to the frame 30 through the gasket 43. Preferably, the gasket 43 can also be made of metal, such that the elastic plate 41 (the third portion 413) and the gasket 43 are connected to the frame 30 by welding. In other embodiments, the elastic plate 41, the gasket 43 and the frame 30 can also be connected to each other by bonding or other ways, and the present invention is not limited thereto. With the installation of the gasket 43, both the thickness of the elastic plate 41 at the third portion 413 and the structural strength of the elastic plate 41 connected to the frame 30 are increased.

Please refer to FIG. 2, FIG. 3 and FIG. 4. Preferably, the elastic plate 41 has at least one first perforation 414 located between the first portion 411 and the second portion 412. The supporting plate 42 has at least one first extension portion 421 located on one side of the supporting plate 42 close to the movable end 102, and the number and positions of the first extension portions 421 correspond to the first perforation 414. In this embodiment, a plurality of (four) first extension portions 421 and a plurality of (four) first perforations 414 are employed as an example for description. The supporting plate 42 is located under the elastic plate 41; i.e., on the side of the elastic plate 41 away from the circuit board 20. With the installation of the first perforation 414, after the first extension portion 421 of the supporting plate 42 passes through the first perforation 414, it can press against the circuit board 20, as shown in FIG. 4.

In addition, the supporting plate 42 further has at least one second extension portion 422, and the first extension portion 421 and the second extension portion 422 are located on two opposite sides of the supporting plate 42. In other words, the second extension portion 422 corresponds to a position between the second portion 412 and the third portion 413 of the elastic plate 41. The second extension portion 422 is placed on the frame 30 such that two opposite surfaces of the second extension portion 422 are in contact with the frame 30 and the elastic plate 41 respectively, as shown in FIG. 4. As shown in FIG. 2 and FIG. 3, preferably, the frame 30 may have at least one receiving portion 33, the number and position of which correspond to the second extension portion 422. The second extension portion 422 can be placed on the receiving portion 33 of the frame 30 such that the two opposite surfaces of the second extension portion 422 are in contact with the receiving portion 33 and the elastic plate 41 respectively. In this embodiment, with the installation of the gasket 43, a space exists between the third portion 413 of the elastic plate 41 and the frame 30, and the second extension portion 422 is sandwiched in the space, thereby limiting the second extension portion 422.

Please refer to FIG. 1 and FIG. 4 simultaneously. In this embodiment, the linkage assembly 40 is close to the movable end 102, and the first portion 411 of the elastic plate 41 is close to the movable end 102. When the user presses the movable end 102, the circuit board 20 presses down the first extension portion 421, and the first extension portion 421 can transmit the pressing force to the frame 30 (e.g., to the second extension portion 422) through the supporting plate 42 to make the linkage assembly 40 stably transmit force to the frame 30, thereby improving the stability of the touch pad module 1 when pressed.

In addition, the first extension portion 421 and the second extension portion 422 respectively abut against the circuit board 20 and the frame 30, rather than being directly fixed to the circuit board 20 and the frame 30, which can keep the elastic movement of the elastic plate 41 and maintain a good pressing touch. In addition, since the upper surface of the second extension portion 422 is in contact with the elastic plate 41 (that is, the second extension portion 422 is pressed by the elastic plate 41), then when the first extension portion 421 is pressed down by the circuit board 20, the supporting plate 42 uses the frame 30 as a fulcrum to transmit force through the second extension portion 422, thereby avoiding power loss caused by sliding and warping of the supporting plate 42.

As shown in FIG. 1 and FIG. 3, preferably, the elastic plate 41 further has at least one bending portion 415. In this embodiment, a plurality of bending portions 415 are employed as an example for description. The bending portions 415 are located between the second portion 412 and the third portion 413, that is; a plurality of bending portions 415 are located between the second portion 412 and the third portion 413. Preferably, the elastic plate 41 also has a plurality of second perforations 416 located between the bent portions 415. In other words, a plurality of holes (i.e., the second perforations 416) are provided between the second portion 412 and the third portion 413 of the elastic plate 41, and the structures between the holes (i.e., the second perforations 416) for connecting the second portion 412 and the third portion 413 are the bending portions 415.

Figure 5A:
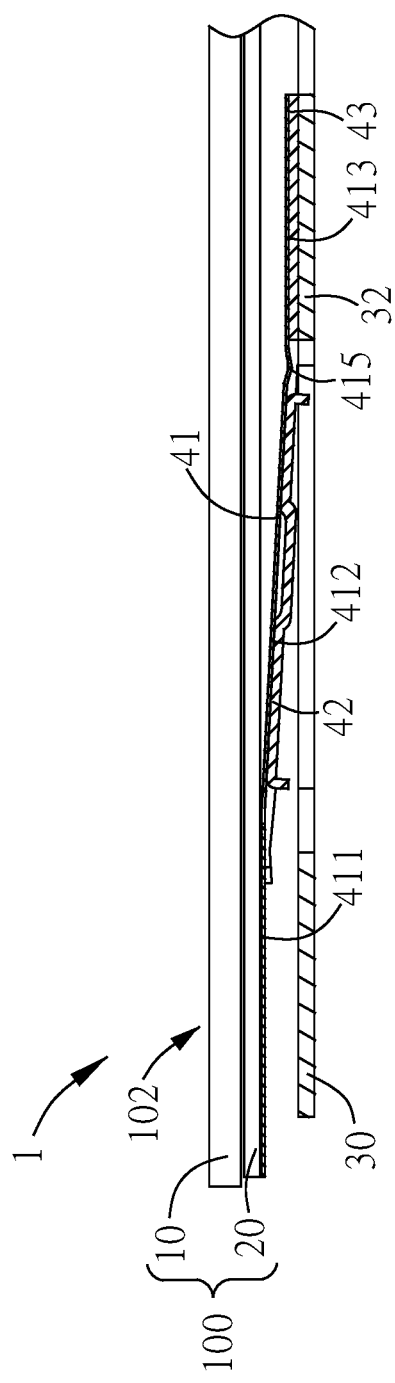
FIG. 5A is a schematic cross-sectional view of the touch pad module shown in FIG. 1 along the line B-B'.
Figure 5B:
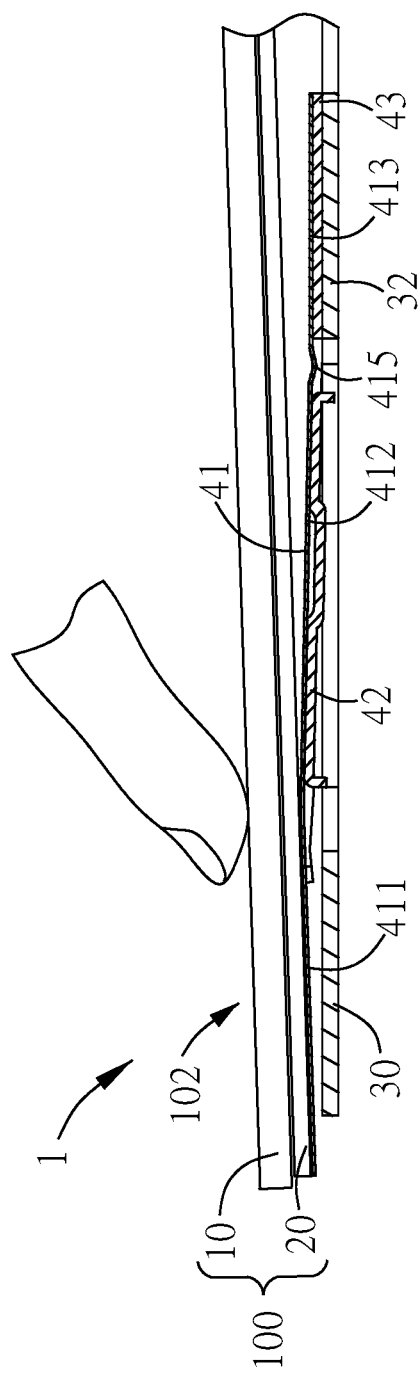
FIG. 5B is a schematic diagram of the touch pad module shown in FIG. 5A after being pressed.

FIG. 5A is a schematic cross-sectional view of the touch pad module shown in FIG. 1 along the line A-A, and FIG. 5B is a schematic diagram of the touch pad module shown in FIG. 5A after being pressed. Please refer to FIG. 5A and FIG. 5B. The cross section of the bending portion 415 can be V-shaped or U-shaped. When the user presses the movable end 102 (as shown in FIG. 5B), the bending portion 415 is used to reduce the stress concentration and the interference caused by the displacement of the elastic plate 41, thereby improving the tactile feeling.

As shown in FIG. 2 and FIG. 3, the design of forming multiple holes (i.e., the second perforations 416) in the elastic plate 41 can reduce the stress of the elastic plate 41 when it is pressed down and improve the smoothness of the pressing touch. Preferably, the elastic plate 41 further has a plurality of third perforations 417 located between the first portion 411 and the second portion 412. The third perforation 417 can also achieve the effect of reducing the stress of the elastic plate 41 when pressed down in order to improve the pressing touch effect. In addition, the elastic plate 41 also has an avoidance structure 418 for the arrangement of the restoring member 50. The avoidance structure 418 is also a hole. In this embodiment, the avoidance structure 418 is located at the first portion 411 of the elastic plate 41.

Figure 6:
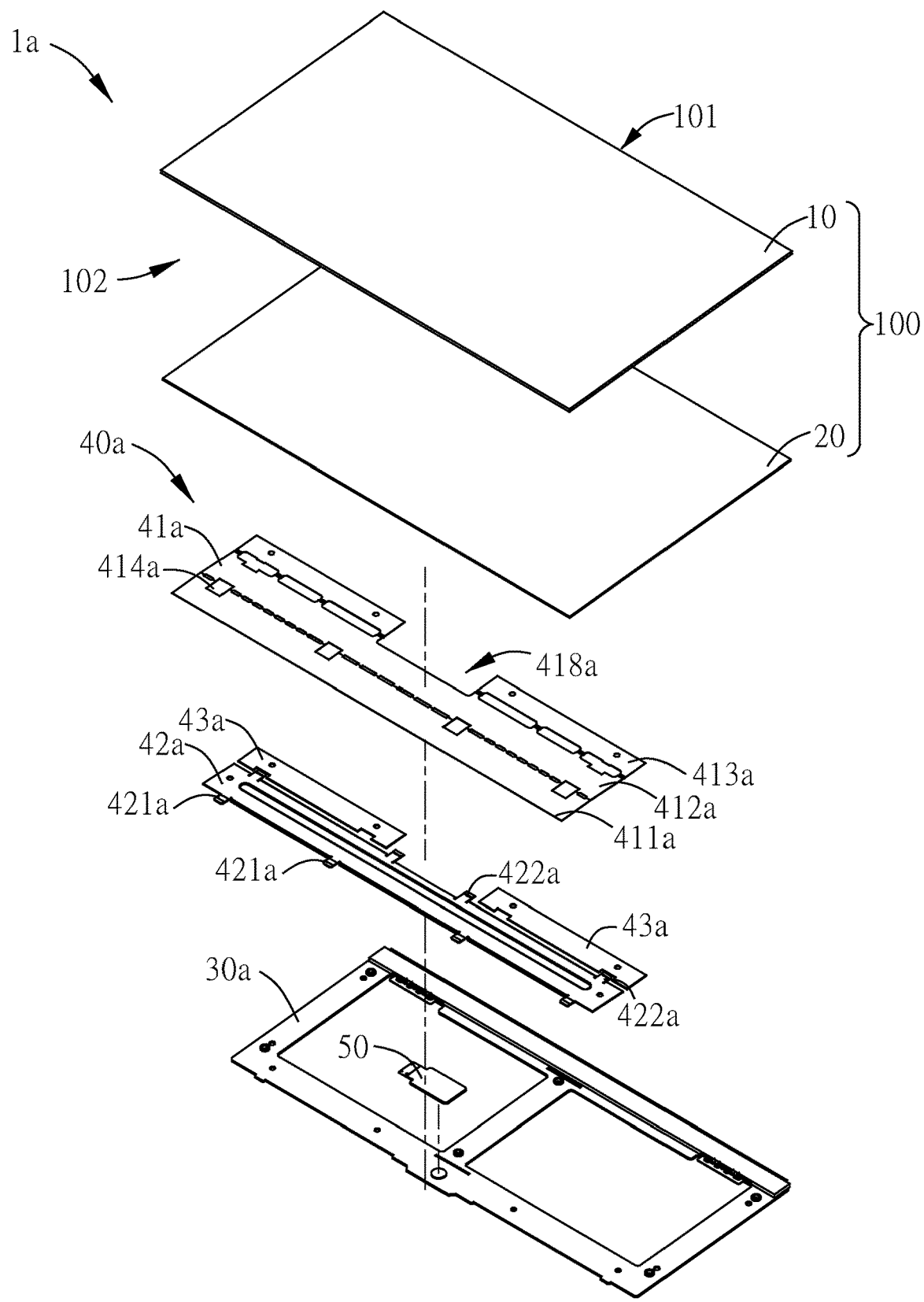
FIG. 6 is an exploded schematic diagram of a touch pad module of another embodiment of the present invention.
Figure 7:
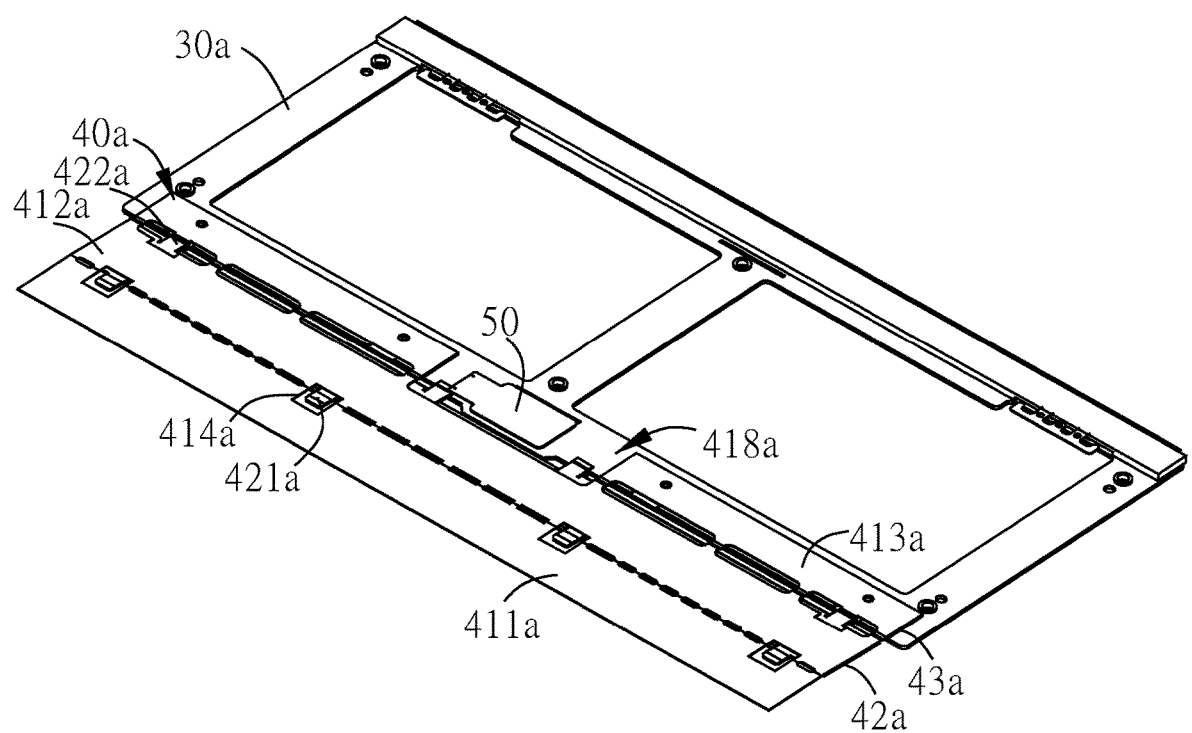
FIG. 7 is a schematic diagram of the linkage assembly and frame shown in FIG. 6 after assembly.

FIG. 6 is an exploded schematic diagram of the touch pad module 1a of another embodiment of the present invention, and FIG. 7 is a schematic diagram of the linkage assembly and the frame shown in FIG. 6 after assembly. Referring to FIG. 6 and FIG. 7, the frame 30 of the above-mentioned embodiment has a rib 32 for connecting the gasket 43 to the third portion 413 of the elastic plate 41. The frame 30a of this embodiment does not have a rib, so the linkage assembly 40a has a different configuration. As such, the structures of the touch board 10, the circuit board 20, and the restoring member 50 of the touch pad module 1a of this embodiment are the same as those of the previous embodiment, and the same reference numerals are adopted.

In this embodiment, the linkage assembly 40a also comprises an elastic plate 41a, a supporting plate 42a and a gasket 43a, wherein the elastic plate 41a can also be divided into a first portion 411a, a second portion 412a and a third portion 413a. Similarly, the first portion 411a is connected to the circuit board 20, the supporting plate 42a is disposed under the second portion 412a, and the third portion 413a is connected to the frame 30a. The difference from the previous embodiment is that the third portion 413a of the elastic plate 41a of this embodiment is connected to one side of the frame 30a by a gasket 43a. In other words, the gasket 43a and the third portion 413a are disposed on the side of the frame 30a. Correspondingly, the avoidance structure 418a of this embodiment is located at the third portion 413a of the elastic plate 41a for the installation of the restoring member 50 located on the side of the frame 30a. In addition, the linkage assembly 40a of this embodiment has two gaskets 43a located on two opposite sides of the avoidance structure 418a for the installation of the restoring member 50 as well.

Preferably, the supporting plate 42a of this embodiment may also comprise structures such as a first extension portion 421a and a second extension portion 422a. Correspondingly, the elastic plate 41a also has a first perforation 414a, and the first extension portion 421a can pass through the first perforation 414a and abut against the touch panel 100. In addition, the two opposite surfaces of the second extension portion 422a are in contact with the frame 30a and the elastic plate 41a, respectively. Regarding the first extension portion 421a, the second extension portion 422a, the first perforation 414a, and other structures that can achieve a better support effect, they are the same as those in above-mentioned embodiment, and the details will not be repeated here.

As above, according to the touch pad module of the present invention, the linkage assembly is disposed between the touch panel and the frame and comprises an elastic plate and a supporting plate. The elastic plate has a first portion, a second portion and a third portion. The first portion is connected to the touch panel, and the third portion is connected to the frame such that the linkage assembly is disposed between the touch panel and the frame through the elastic plate. The supporting plate is correspondingly disposed on the second portion to increase the overall rigidity of the linkage assembly. With the installation of the linkage assembly, then when the touch pad module is pressed, the arm of the pressing force of the touch pad module can be shortened, thereby achieving the effects of reducing deformation, reducing shaking and improving the tactile feeling of pressing.

It should be noted that the described embodiments are only for illustrative and exemplary purposes and that various changes and modifications may be made to the described embodiments without departing from the scope of the application as disposed by the appended claims.

What is claimed is:

1. A touch pad module, comprising:
   a touch panel;
   a frame disposed under the touch panel; and
   a linkage assembly disposed between the touch panel and the frame, the linkage assembly comprising:
      an elastic plate, which has a first portion, a second portion and a third portion, the second portion being located between the first portion and the third portion, the first portion being connected to the touch panel, and the third portion being connected to the frame; and
      a supporting plate correspondingly disposed on the second portion of the elastic plate.

2. The touch pad module defined in claim 1, wherein the elastic plate has at least one first perforation located between the first portion and the second portion and the supporting plate has at least one first extension portion, which passes through the first perforation and abuts against the touch panel.

3. The touch pad module defined in claim 1, wherein the supporting plate has at least one second extension portion, the two opposite surfaces of which are in contact with the frame and the elastic plate, respectively.

4. The touch pad module defined in claim 1, wherein the elastic plate has at least one bending portion located between the second portion and the third portion.

5. The touch pad module defined in claim 4, wherein the elastic plate has a plurality of said bending portions and a plurality of second perforations, and the second perforations are located between the bending portions.

6. The touch pad module defined in claim 1, wherein the supporting plate has a rigid reinforced structure located in the central area of the supporting plate.

7. The touch pad module defined in claim 1, wherein the rigidity of the supporting plate is greater than that of the elastic plate.

8. The touch pad module defined in claim 7, wherein the thickness of the supporting plate is greater than that of the elastic plate.

9. The touch pad module defined in claim 1, wherein the linkage assembly further comprises a gasket, which is disposed on the surface of the elastic plate close to the frame and located in the third portion, and the elastic plate is fixed to the frame through the gasket.

10. The touch pad module defined in claim 1, wherein the touch panel comprises a fixed end and a movable end opposite to each other, the linkage assembly is close to the movable end, and the first portion of the elastic plate is close to the movable end.

11. The touch pad module defined in claim 1, wherein the touch panel comprises a touch board and a circuit board, the touch board having a touch surface and a bottom surface opposite to each other and the circuit board being disposed on the bottom surface.

* * * * *